(12) United States Patent
Armitage et al.

(10) Patent No.: US 9,315,195 B2
(45) Date of Patent: *Apr. 19, 2016

(54) DRIVER, VEHICLE, AND OPERATIONAL ANALYSIS

(71) Applicant: Cartasite, Inc., Denver, CO (US)

(72) Inventors: David L. Armitage, Golden, CO (US); Gregory Froim Kushnir, Denver, CO (US); Mark Alvin Mason, Thornton, CO (US)

(73) Assignee: Cartasite, Inc., Denver, CO (US)

( * ) Notice: Subject to any disclaimer, the term of this patent is extended or adjusted under 35 U.S.C. 154(b) by 71 days.

This patent is subject to a terminal disclaimer.

(21) Appl. No.: 14/213,090

(22) Filed: Mar. 14, 2014

(65) Prior Publication Data
US 2014/0199662 A1     Jul. 17, 2014

Related U.S. Application Data

(63) Continuation-in-part of application No. 14/100,933, filed on Dec. 9, 2013, which is a continuation-in-part of application No. 12/902,087, filed on Oct. 11, 2010, now Pat. No. 8,604,920.

(60) Provisional application No. 61/253,333, filed on Oct. 20, 2009.

(51) Int. Cl.
| | |
|---|---|
| *B60Q 1/00* | (2006.01) |
| *B60W 40/09* | (2012.01) |
| *G07C 5/00* | (2006.01) |
| *G09B 19/16* | (2006.01) |
| *G07C 5/08* | (2006.01) |
| *G06Q 10/06* | (2012.01) |
| *B60K 35/00* | (2006.01) |

(52) U.S. Cl.
CPC .............. *B60W 40/09* (2013.01); *B60K 35/00* (2013.01); *G06Q 10/06398* (2013.01); *G07C 5/008* (2013.01); *G07C 5/0816* (2013.01); *G09B 19/167* (2013.01); *B60K 2350/1092* (2013.01); *B60W 2520/10* (2013.01); *B60W 2520/105* (2013.01); *G07C 5/085* (2013.01)

(58) Field of Classification Search
CPC ....................................................... B60W 40/09
USPC .............. 340/439, 575, 576, 461, 438, 425.5; 701/33.4, 29.3, 123; 434/65; 705/7.38
See application file for complete search history.

(56) References Cited

U.S. PATENT DOCUMENTS

| | | | |
|---|---|---|---|
| 5,394,136 A | 2/1995 | Lammers et al. | |
| 8,604,920 B2 * | 12/2013 | Armitage et al. ............. | 340/439 |
| 2004/0236476 A1 | 11/2004 | Chowdhary | |
| 2006/0112103 A1 | 5/2006 | Besserman et al. | |
| 2007/0001831 A1 | 1/2007 | Raz et al. | |
| 2007/0005404 A1 * | 1/2007 | Raz et al. .......................... | 705/4 |
| 2008/0255722 A1 | 10/2008 | McClellan et al. | |
| 2010/0030586 A1 | 2/2010 | Taylor et al. | |

(Continued)

*Primary Examiner* — Brent Swarthout
(74) *Attorney, Agent, or Firm* — Thomas A. Dougherty (57) ABSTRACT

Disclosed are methods, systems, and software for operation a driver analysis system which includes receiving vehicle operation data corresponding to operation of vehicles by drivers from vehicle monitoring system, processing at least a portion of the vehicle operation data to determine driving performance of at least one driver, generating a driving report which identifies the driving performance of at least one driver, and presenting the driving report, where the driving report includes a driving score and/or eye movement index.

18 Claims, 8 Drawing Sheets

(56) References Cited

U.S. PATENT DOCUMENTS

| | | |
|---|---|---|
| 2011/0012720 A1 | 1/2011 | Hirschfeld |
| 2011/0063099 A1 | 3/2011 | Miller et al. |
| 2012/0044063 A1 | 2/2012 | McClellan et al. |
| 2014/0019167 A1* | 1/2014 | Cheng et al. ............ 705/4 |
| 2014/0058761 A1* | 2/2014 | Freiberger et al. ........ 705/4 |
| 2014/0210625 A1* | 7/2014 | Nemat-Nasser ......... 340/575 |
| 2014/0272810 A1* | 9/2014 | Fields et al. ............ 434/65 |

\* cited by examiner

DRIVER, VEHICLE, AND OPERATIONAL ANALYSIS

RELATED APPLICATIONS

This application is related to, and is a continuation in part application of, and claims priority to, U.S. patent application Ser. No. 14/100,933 filed Dec. 9, 2013, entitled "Driver Performance and Consequence," which is a continuation-in-part of U.S. patent application Ser. No. 12/902,087 filed Oct. 11, 2010 entitled "Systems and Methods for Vehicle Performance Analysis and Presentation," which claims priority to U.S. Provisional Patent Application No. 61/253,333, entitled "Systems and Methods for Vehicle Performance Analysis and Presentation" filed on Oct. 20, 2009, which are all hereby incorporated by reference in their entirety.

TECHNICAL BACKGROUND

Performance monitoring tools are commonly used to assess the operation of a vehicle, such as an automobile, airplane, or the like. Such tools analyze the performance of the vehicle and the various internal systems which make up the vehicle. In addition, the monitoring systems may assess the behavior of the person operating the vehicle and gather data information pertaining to how that person is operating the vehicle. These assessments may be achieved in both real time and non-real time manners.

Most newer cars and trucks contain On Board Diagnostics (OBD) systems which provide some level of self-diagnostic and information reporting capability. OBD systems were originally developed to be used during the manufacturing and test processes. However, the capabilities of these systems and their uses have expanded dramatically since that time. Currently, OBD systems give repair technicians, vehicle owners, and emissions testing agencies electronic access to state of health and operational information pertaining to many different vehicle subsystems. Historically, many vehicle functions like braking, speed indication, and fuel delivery were performed by mechanical systems and components. Presently, many of these vehicle functions are controlled or monitored through electronic means, thereby making electronic information about the performance and operations of those systems readily available. It is now possible to electronically monitor tens, if not hundreds, of operational characteristics of a vehicle using OBD systems.

While OBD is a generic term referring to any of a class of systems which provide these reporting capabilities, there are industry standard implementations which provide for standardized connectors, pinouts, and signal characteristics, among other things. Currently, the most prevalent system is the OBDII system. OBDII provides access to a wide range of data from the engine control unit (ECU) as well as other vehicle systems. The system offers standardized methods for requesting various diagnostic data as well as a list of standard parameters which may be available from an OBDII system.

The present invention is discussed and explained with respect to its interaction with the OBDII system but is not limited to operation with an OBDII system. The present invention encompasses operation with other versions of the OBD system, past and future, as well as other vehicle data interfaces which provide similar vehicle operation data.

Driver behavior and the potential for vehicle accidents has been a longstanding concern. In recent years, driver behavior has garnered additional attention in various media outlets. In particular, some media have reported on the impact of new communication technologies, such as cell phones and text messaging, on driver behavior. It has been shown that engaging with these technologies while operating a vehicle can have significant adverse effects. Furthermore, tired or distracted driving can be very dangerous. There are various systems and algorithms for identifying this.

Consequently, business owners and government agencies who have drivers operating vehicles on their behalf have heightened concerns about the driving behaviors of their drivers and the ensuing risks which may be associated with those behaviors. Parents may be concerned about the driving behaviors of their children and wish to affect those driving behaviors for similar reasons.

In addition to affecting the risks of an accident, driver behavior may have other important cost and environmental impacts as well. For example, rapid or frequent acceleration of a vehicle may result in less efficient fuel consumption or higher concentrations of pollutants. In addition, hard braking or excessive speed may result in increased maintenance costs, unexpected repair costs, or require premature vehicle replacement.

OVERVIEW

In various embodiments, systems, software, and methods are disclosed for operating a driver analysis system to analyze driver behavior and providing a presentation of this information. In an embodiment, software and a method of operating a driver analysis system comprises receiving vehicle operation data corresponding to operation of one or more vehicles operated by one or more drivers by the driver analysis system, generating a driving report which identifies the driving performance of a target driver, and presenting the driving report for viewing by one or more entities, wherein the vehicle operation data comprises an indication of eye movement index of the target driver.

In another embodiment, a driver analysis system a communication interface configured to receive vehicle operation data corresponding to operation of a one or more of vehicles operated by one or more drivers, an imaging device configured to determine eye movement of the one or more drivers, a processing system configured to process at least a portion of the vehicle operation data or the eye movement to determine driving performance of the one or more drivers, and generate a driving score which generally identifies the driving performance of the one or more drivers, wherein the processing system is further capable of presenting the driving performance for the one or more drivers.

In another example embodiment, vehicle operation data is received at a communication interface in the driver analysis system over the internet from monitoring systems located on board the vehicles. The driver analysis system processes the vehicle operation data to determine driving performance of the target driver relative to driving performance of a peer group, generates a driving report which identifies the driving performance of the target driver, and transfers the driving report from the communication interface for delivery to a target device.

In another example embodiment, the monitoring systems which gather vehicle operation data are powered through an OBD port on each vehicle. The monitoring systems gather some of the vehicle operation data from the OBD port and gather other vehicle operation data from a source other than the OBD port.

DETAILED DESCRIPTION

FIGS. 1-8 and the following description depict specific embodiments to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments and variations of the invention. As a result, the invention is not limited to the specific embodiments described below, but only by the claims and their equivalents.

The possibility of accidents is always a concern when operating a motor vehicle. Accidents can cause injuries, property damage, financial loss, and business disruption. Studies have shown that increased use of mobile phones, texting, and other electronic device use by drivers increases these risks. Furthermore, studies have shown that the amount that a driver's eyes move, the more alert they are. As eye movement decreases, so does driver attentiveness. This may be caused by a driver talking on a cell phone, drowsiness, driving in a rural area, driver inexperience, impairment, or other reason.

Business owners have a vested interest in making sure their drivers are exercising careful and responsible vehicle operation. Parents have similar concerns with respect to their children.

In addition to increasing the risks of accident or injury, aggressive or irresponsible driver behavior can have other adverse affects. Excessive acceleration and excessive speed can result in increased fuel costs, increased emission of pollutants, and premature vehicle wear. Similarly, frequent hard braking events may be an indicator that the vehicle is being operated in a manner which increases costs or the risk of accidents. In addition to causing premature wear, increased maintenance costs, and increased fuel costs, these behaviors may also lead to a shortened vehicle life and result in a need for premature replacement of the vehicle.

Many studies have been done regarding driver attentiveness. During attentive operation of a vehicle, the eyes of a driver move and focus rapidly on different area of the field of vision, including the rear view mirrors, on either side of the vehicle, and at various objects/area of interest in front of the vehicle. When a driver's gaze is fixed, or when the driver is otherwise not attentive, the eyes of the driver do focus or move about as rapidly. As the eyes of the driver move to focus less, it is an indication of reduced attentiveness. This could be because of a distraction, such as a cell phone, or wreck, but also could be attributed to drowsiness, or alcohol or other impairment.

For the reasons discussed above, it is desirable to gather vehicle operation data in order to monitor driver behavior as well as to formulate metrics which can be used to facilitate improvements. Because no driver is perfect and because circumstances will always require drivers to occasionally brake hard, accelerate quickly or engage in other similar driving behaviors, it may be desirable to perform a comparison to other drivers in similar circumstances to best identify realistic objectives and target areas for improvement. There are many variables which affect operational behavior like driver experience, vehicle type, driving environment, and geographical variations, as well as others. Therefore, driver behavior metrics are most meaningful and most fairly applied when a driver is compared to other peer drivers who are operating under the challenges of similar conditions.

Rather than simply punish drivers who exceed certain predefined thresholds, it is beneficial to provide drivers ongoing information about their driving performance and how that driving performance compares to the performance of the driver's peers. This constructive feedback gives the driver sufficient information to manage his or her driving behaviors in a proactive manner and understand his or her performance relative to peers. It gives the driver an opportunity to make improvements and see the results of those improvements. Providing the information in a historical format allows drivers to track their improvements over time.

Since driving conditions vary, incremental improvement of every driving behavior metric during every time period may not be realistic and some undulation is expected. For this reason, it is desirable to also determine an overall driving score which summarizes the driver's overall performance for the time period in the form of a single performance score. By implementing a driver analysis system which provides this information directly to drivers in a concise and summarized graphical format, many drivers may be encouraged or motivated to make improvements and will have the information to track their progress without the involvement of or pressure from their management.

Figure 1:
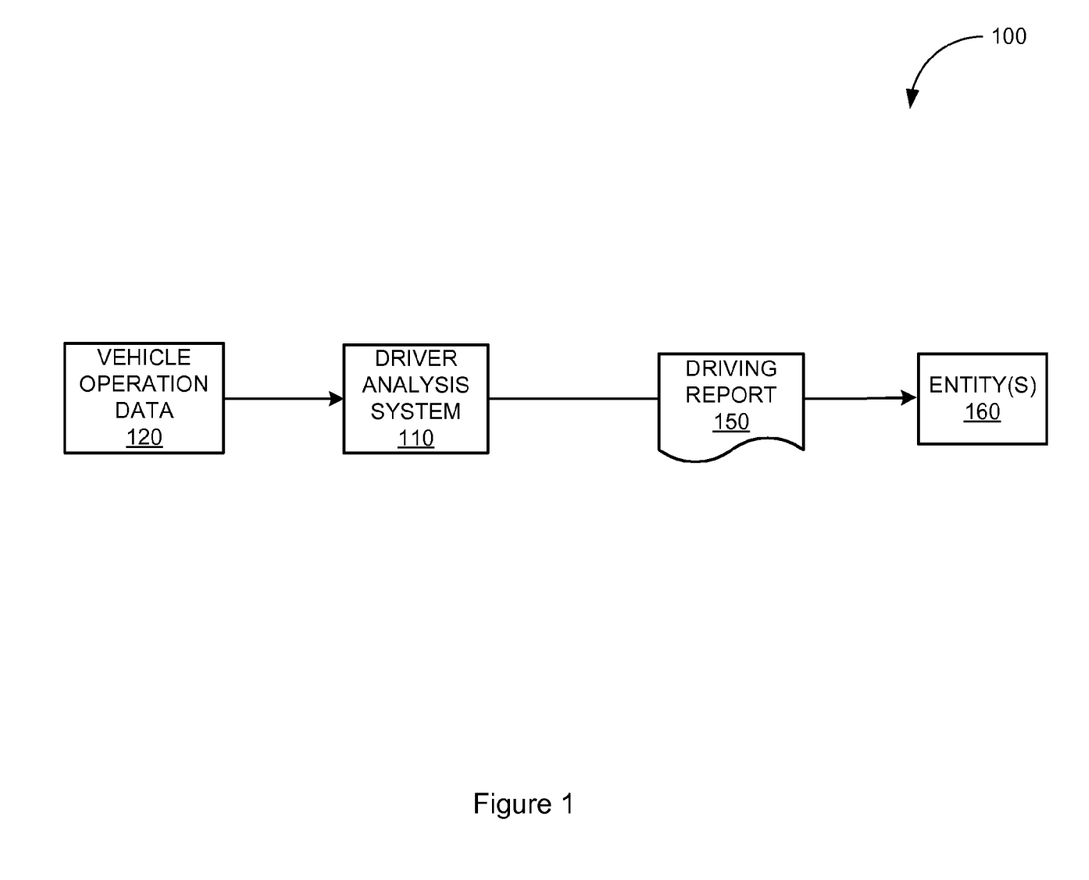
FIG. 1 illustrates a driving report system.

FIG. 1 illustrates driving report system 100. Driving report system 100 comprises driver analysis system 110 which receives vehicle operation data 120 from multiple vehicles. Driver analysis system 110 uses this data to generate driving report 150 which is delivered to one or more entities 160.

Vehicle operation data 120 may be received from vehicle monitoring systems associated with one or more vehicles. Vehicle monitoring systems may include one or more devices such as one or more smartphones, imaging devices, and other devices capable of determined and/or sensing driver, vehicle, and/or operational data. Vehicle monitoring systems may also include a device which is powered by the OBD port, which includes an accelerometer, GPS functionality, flash memory, a processor, a real-time operating system, satellite communication capabilities, cellular communication capabilities, near filed communication capabilities, and Bluetooth-type communication capabilities. The imaging device may include a camera, smartphone, or other device capable of sensing or determining eye movement of the driver.

Driver analysis system 110 may analyze the data 120 and/or other data from other sources, such as databases with information about the driver experience, driver driving characteristics, databases with information regarding speed limits, and information such as characteristics of the area the vehicles are driving in, and other databases, and create a driving report 150. Driving report 150 may include an overall safety score for the driver or vehicle, as well as an eye movement index, and other information. The overall safety score and the eye movement index may be created or determined by the driver analysis system based at least in part on all of the data received. The overall safety score may be based at least in part on the eye movement index. The eye movement index may be based at least in part on one or more of characteristics of the target driver, information associated with the location, and information associated with the eye movement of the target driver, among other data.

Figure 2:
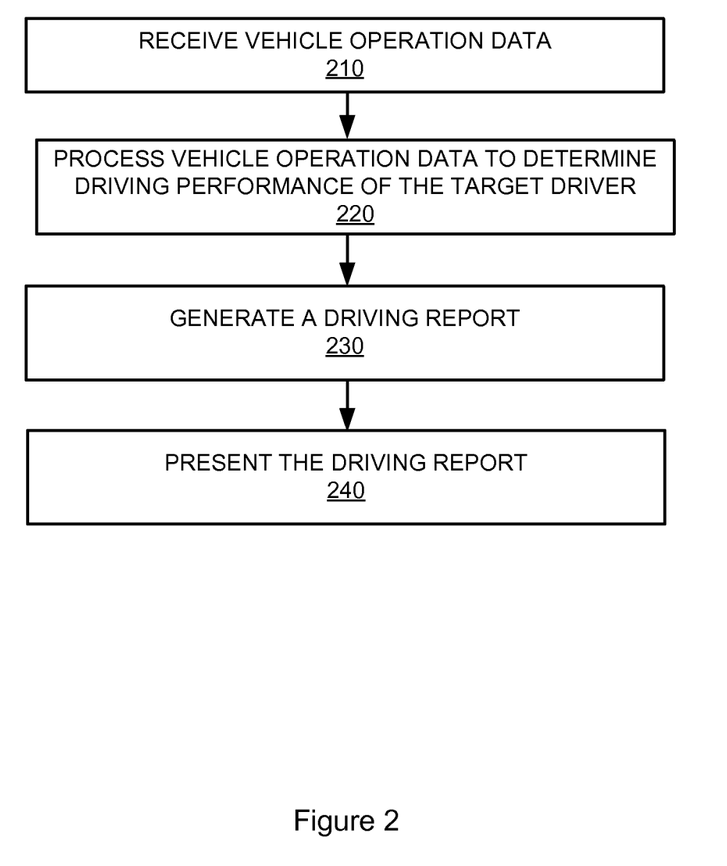
FIG. 2 illustrates the operation of a driving report system.

FIG. 2 is a flow chart illustrating a method of operating driving report system 100. Driver analysis system 110 receives vehicle operation data 120 which is collected from vehicle monitoring systems associated with multiple vehicles driven by different drivers (step 210). Driver analysis system 110 may optionally identify a peer group of drivers associated with the driver of interest, target driver 160. Next, driver analysis system 110 processes the vehicle operation data to determine the driving performance of target driver 160 (step 220). The performance may be relative to the driving performance of the peer group. Driver analysis system 110 may then generate driving report 150 which identifies the driving performance of the target driver (step 230) and presents driving report 150 to a target device for viewing or printing by target driver 160 or other entity (step 240). The report includes the driver's performance in at least one category and may indicate how that performance compares to that of the peer group.

Figure 3:
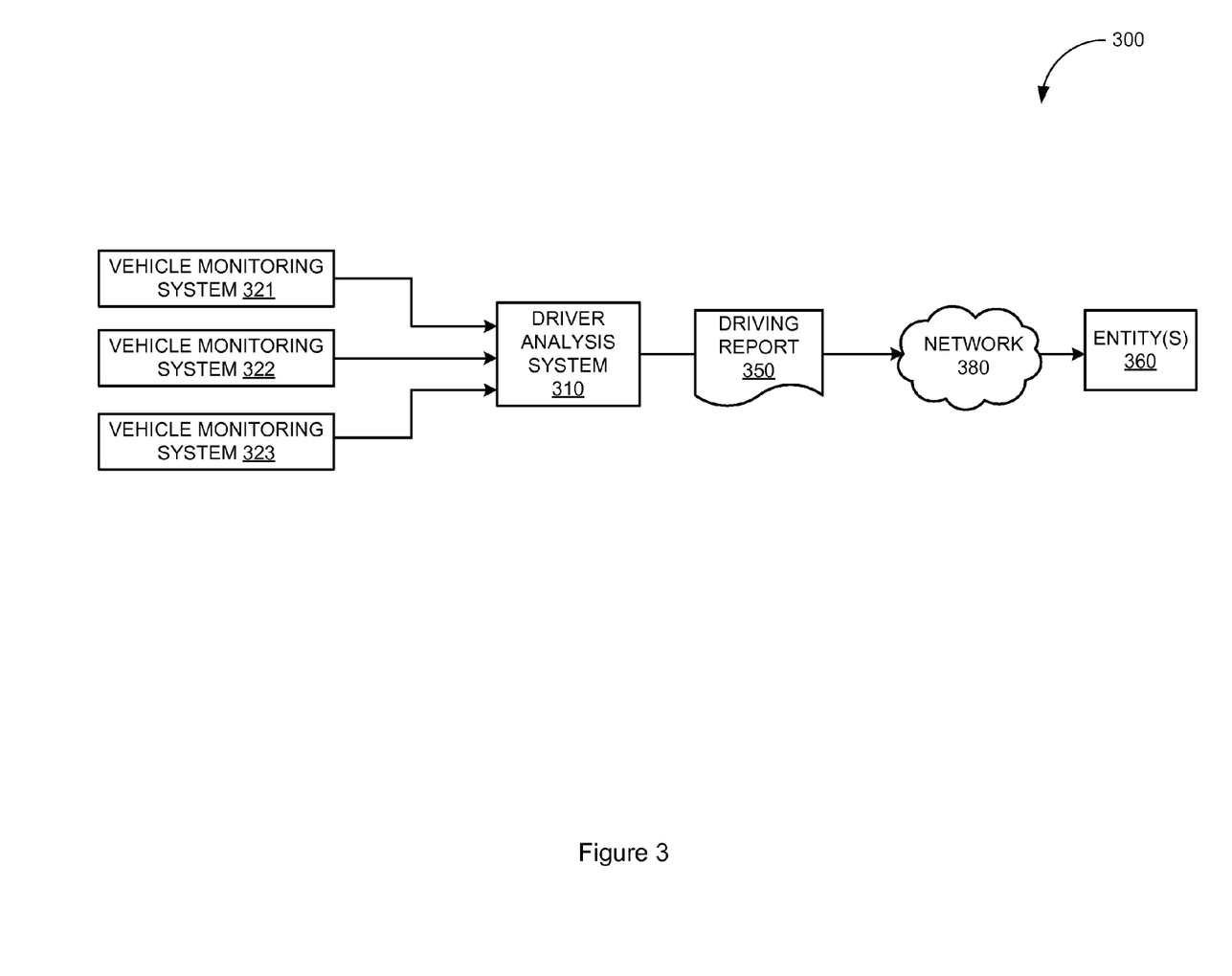
FIG. 3 illustrates a driving report system.

FIG. 3 illustrates driving report system 300. Driving report system 300 comprises a driver analysis system which receives vehicle operation data from vehicle monitoring systems and uses this data to generate a driving report which is delivered to a target driver or other entity over the internet or other means.

In FIG. 3, driver analysis system 310 receives vehicle operation data from vehicle monitoring systems 321-323. Vehicle monitoring systems 321-323 include one or more electronic devices which are on board/adjacent each individual vehicle and collect data about the operation of the vehicle over a period of time. The data includes information about how the vehicle is being used and the driver's operational behavior characteristics.

Vehicle monitoring systems 321-323 may include one or more devices such as one or more smartphones, imaging devices, and other devices capable of determined and/or sensing driver, vehicle, and/or operational data. Vehicle monitoring systems 321-323 may receive information and power from the OBD port of the vehicle. Vehicle monitoring systems may also include a device which is powered by the OBD port, which includes an accelerometer, GPS functionality, flash memory, a processor, a real-time operating system, satellite communication capabilities, cellular communication capabilities, near filed communication capabilities, and Bluetooth-type communication capabilities. The imaging device may include a camera, smartphone, or other device capable of sensing or determining eye movement of the driver.

Periodically, each of the vehicle monitoring systems transfers this data to driver analysis system 310. The vehicle operation data may include data relating to acceleration, speed, braking, lateral acceleration, fuel consumption, emissions, location, antilock braking system, driving hours, maintenance, safety systems, eye movement, information about the areas driven in, as well as potentially many other types of vehicle diagnostics and information about how the vehicle is being operated.

Upon receipt of the vehicle operation data from multiple vehicles, driver analysis system 310 begins the process of generating a driving report for a particular driver, target driver or other entities 360. Driver analysis system 310 may also receive information from other sources and databases including databases with information about the driver experience, driver driving characteristics, databases with information regarding speed limits, and information such as characteristics of the area the vehicles are driving in, and other databases or other information.

In order to analyze the operation data and provide meaningful and valid comparisons for target driver, driver analysis system 310 may identifies a peer group of similar drivers to target driver. This peer group may be determined based on selecting other drivers who drive similar types of vehicles, have similar driving assignments, have similar levels of experience, drive in similar geographic areas, or other factors which suggest useful comparisons.

Next, driver analysis system 310 processes the vehicle operation data and/or other data to determine driving performance of target driver. The driving performance may be relative to driving performance of the selected peer group based upon the various types of operation and other data gathered. One example is eye movement. Through the course of operation, vehicle monitoring systems 321-323 gather data for the frequency of eye movement of the driver, as well as characteristics about the area, phone usage, or other distractions. Thresholds for various metrics may be set quite low so as to capture events that are minor in nature. Relatively insignificant events may be useful in characterizing patterns of behavior. While these minor events will happen occasionally with all drivers because unexpected situations do occur, a higher rate of these events may suggest excessive inattentiveness, drowsiness, personal electronics usage, or other undesirable behaviors.

In an example, driver analysis system 310 determines an eye movement index for all drivers in the peer driver group. For example, this may be determined as a rate—an average eye movement for each hour of driving. Alternatively, it may be determined as an absolute figure for a fixed time period—a number of eye movements per day/hour, etc. Driver analysis system 310 then determines the rate of occurrence for target driver 360 in the same manner The performance of target driver 360 may be compared to the average for the peer group and may also be compared to other characteristics of the peer group including, but not limited to, minimum, maximum, best, and worst. Those skilled in the art will recognize there are many other operational and behavioral parameters which may be analyzed and many types of statistical analysis which may be performed on the data. The invention is not limited to the specific examples provided above.

Based on the results of the analysis, driver analysis system 310 generates driving report 350 which identifies the driving performance of the target driver and may also include a comparison to the peer group. Driver analysis system 310 transfers driving report 350 to a target device for viewing by target driver or other entities 360 by sending it over network 380.

Entities 360 receives driving report 350 over network 380 and views it on a target device. The target device may be a personal computer, mobile phone, mobile internet terminal, or other type of electronic communication device. Driving report 350 may be transmitted in the form of an email, text message, or displayed on a web page, or any other method or system. Driving report 350 may also be incorporated into a software document, such as a MS Word file, a PDF file, a Power Point file, or the like. In yet another example, the analysis may be provided in a video format and played-out to the user. An audio presentation of the analysis may also be possible, such as by way of a voicemail message, a phone recording, or the like.

Network 380 may include a wired or wireless network, such as satellite, cellular, Wi-Fi, internet, Bluetooth-type, near field communication-type, or any other type of network or communication schema. Entity(s) 360 may include a supervisor, driver, group, or other entities.

Figure 4:
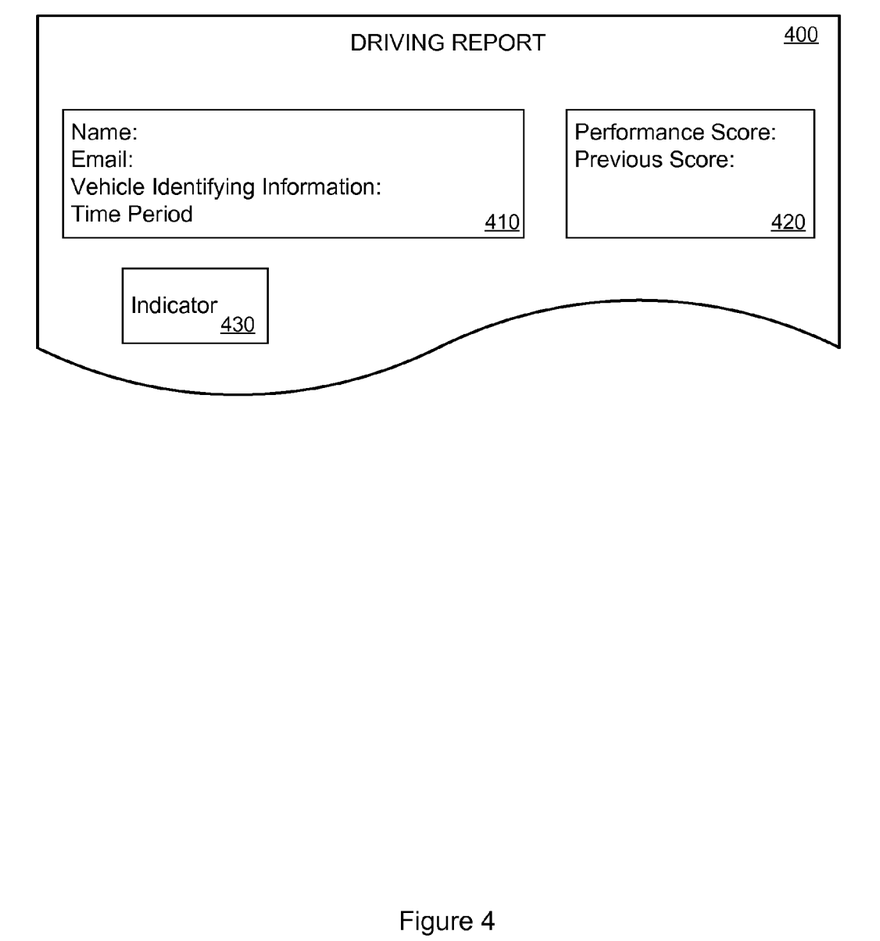
FIG. 4 illustrates a driving report.

FIG. 4 illustrates an example driving report. In information block 410, driving report 400 includes information identifying the driver, the driver's email address, the vehicle driven, and the time period to which the report applies. Additional information may be included to identify the vehicle including make, model, license plate number, or other identifying information. Block 420 includes the driver's performance score for the current period as well as the previous performance score. The performance score is a combined score which represents an overall score based on the various individual categories of operation characteristics, if more than one, which are reported and considered. Driving report 400 may also include multiple previous performance scores enabling the driver to easily see the performance trend over time relative to other drivers.

In this example, driving report 400 includes one or more indicators 430. Indicators 430 may indicate eye movement index, or other indicator. Indicators 430 may also be capable of indicating if a safety system has been tampered with, bypassed, etc. The determination of tampering, etc. may be based on vehicle operation data from various sources.

Figure 5:
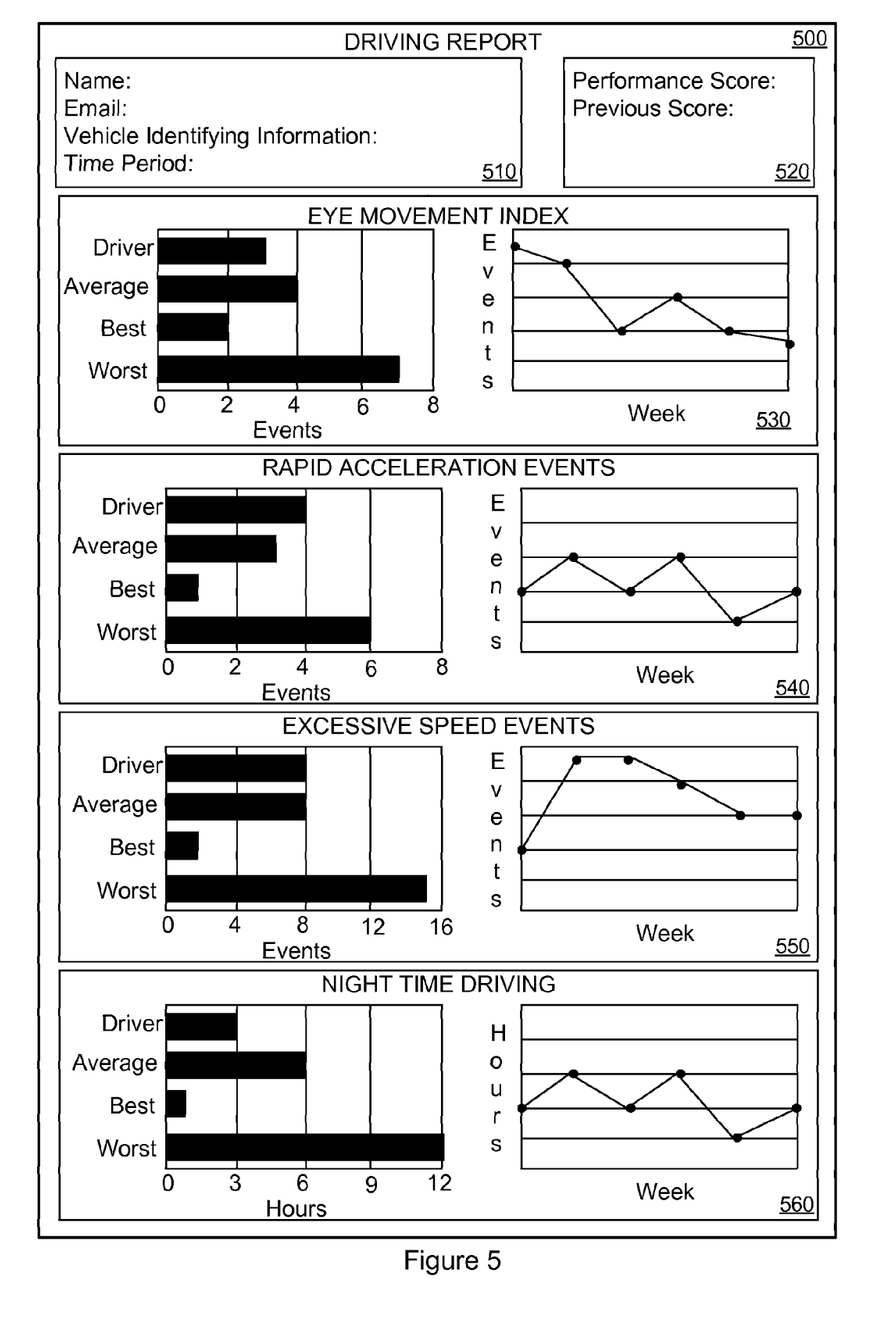
FIG. 5 illustrates a driving report.

FIG. 5 illustrates an example of another driving report. In information block 510, driving report 500 includes information identifying the driver, the driver's email address, the vehicle driven, and the time period to which the report applies. Additional information may be included to identify the vehicle including make, model, license plate number, or other identifying information. If the driver drove multiple vehicles during the time period, each vehicle could be listed and the consolidated information could be included on driving report 500.

Block 520 of driving report 500 includes the driver's performance score for the current period as well as the previous performance score. The performance score is a combined score which represents an overall score based on the various individual categories of specific behaviors which are reported and considered. Driving report 500 may also include multiple previous performance scores such that the driver can easily see the performance trend over time relative to other drivers.

In addition, driving report 500 includes detailed reporting information on specific operational characteristics in blocks 530-560. Block 530 includes information on eye movement index for the target driver. The number of eye movement index events the target driver had in the reporting period is compared to the average for the peer group as well as to the drivers in the peer group who had the best and worst performance for the time period as measured by number of events. Rather than absolute quantity, the comparison could be based on a rate such as eye movement events per hour, per week, or per hundred miles driven. Block 520 also includes a historical graphical representation illustrating the driver's eye movement index performance trend over time. Blocks 540, 550, and 560 provide similar illustrations of reporting information for rapid acceleration events, excessive speed events, and number of night time driving hours.

Those skilled in the art will recognize there are many other operational and behavioral parameters which may be analyzed and included in driving report 500. There are also many types of statistical analysis which may be performed on the data. The resulting driving information may be graphically presented and displayed in many different ways. The invention is not limited to the specific examples and methods of presentation provided in FIG. 5.

In addition to periodic driver reports, immediate alerts may be generated and provided as well. For example, if a number of hard braking events are detected beyond a threshold, the user may be provided with an alert describing this driving behavior. Such an immediate alert may result in a reduction in hard braking events, thereby increasing safety. The alerts may be provided in real-time, but may also be provided some time later after the events are detected.

Figure 6:
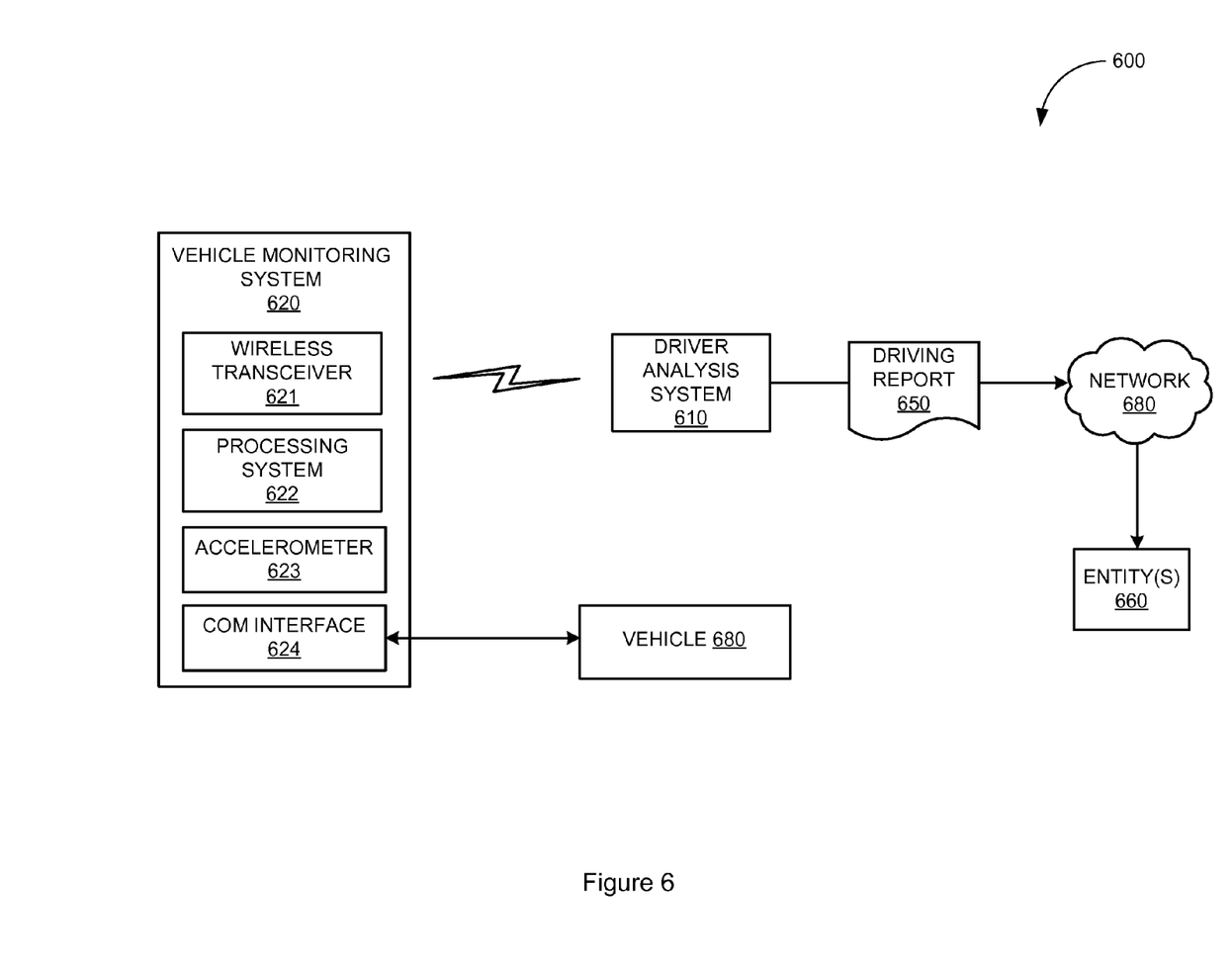
FIG. 6 illustrates a driving report system.

FIG. 6 illustrates driving report system 600. Driving report system 600 comprises a driver analysis system which receives vehicle operation data from vehicle monitoring system and other devices and sources through a wired or wireless connection and uses this data to generate a driving report which is delivered to a target driver over a network.

In the example in FIG. 6, driver analysis system 610 receives vehicle operation data from multiple vehicle monitoring system similar to that illustrated by vehicle monitoring system 620. Vehicle monitoring system 620 is an electronic device which is generally adjacent or coupled to vehicle 680 and collects data regarding the operation of the vehicle 680 over a period of time. Vehicle monitoring system 620 interfaces to and collects data from vehicle 680 through a connection between On Board Diagnostic (OBD) interface 624 and OBD port 681. The OBD port is a standardized interface which allows vehicle monitoring system 620 to capture many different types of data from vehicle 680's electronic and engine management systems. Vehicle monitoring system 620 could also use and transmit information from a smartphone of an occupant of the vehicle, or from a GPS system associated with the vehicle, among other sources of data.

In addition to the operational data gathered through OBD port 681, vehicle monitoring system 620 gathers operational data from other sources as well, such as an imaging device, and/or smartphone. In one example, vehicle monitoring system 620 contains accelerometer 620 which is used to keep track of the location and speed of vehicle 680. This location and speed information may also be combined with the other operational data gathered. Vehicle monitoring system 620 may gather location and speed information from other devices such as a global position system (GPS) receiver. In addition, vehicle monitoring system 620 may collect vehicle operation data from other sensors or sources which are neither part of vehicle monitoring system 620 nor vehicle 680, such as a personal communication device, such as a smartphone.

Vehicle monitoring system 620 could also include a global positioning system (GPS) receiver, to receive and interpret signals from positioning satellites to determine geographic coordinates. In an example, vehicle monitor 620 includes an accelerometer, GPS functionality, gyroscope, flash memory, a processor, a real-time operating system, as well as cellular, satellite, near filed communication capabilities, and Bluetooth-type communication capabilities.

Processing system 622 in vehicle monitoring system 620 receives, processes, and stores all of the gathered vehicle operation data such that it can be transmitted at the appropriate time. Vehicle monitoring system 620 uses wireless transceiver 621 to transmit the set of vehicle operation data to driver analysis system 610. This process may be performed frequently or may be performed only once each reporting period. The transmission may be initiated by either vehicle monitoring system 620 or by driver analysis system 610. The vehicle operation data may include data describing eye movement, acceleration, speed, braking, fuel consumption, location, driving hours, maintenance, status of safety systems, as well as potentially many other measures of driver behavior, vehicle operation data, and vehicle diagnostics.

After driver analysis system 610 receives data for multiple drivers or vehicles, it begins the process of generating a driving report for a particular driver, target driver/other entity 660. In order to analyze the operation data and provide meaningful and valid comparisons for target driver 660, driver analysis system 610 may identify a peer group of drivers associated with target driver 660. This peer group may be determined based on selecting other drivers who drive similar types of vehicles, have similar driving assignments, similar levels of experience, drive in similar geographic areas, or other factors which suggest useful comparisons. If a company wants to perform a broader benchmark comparison of its drivers to the drivers of other entities, the data may also be shared such that a peer group includes drivers which are employed by those other entities.

Next, driver analysis system 610 processes the vehicle operation data to determine driving performance of target driver relative to driving performance of the selected peer group based upon various types of operation data gathered. Alternatively, an individual assessment may be made. One example is rapid acceleration events. Through the course of operation, vehicle monitoring system 620 and/or other devices gather data each time the vehicle accelerates at a rate which exceeds an expected or predetermined threshold. This acceleration information may be gathered from the electronic systems of the vehicle as reported through OBD port 681 or may be gathered from accelerometer 623, or from another device. While all drivers may have an occasional, legitimate need to accelerate rapidly, a higher rate of these events may suggest aggressive driving, excessive speed. or other undesirable driver behaviors.

In this example, driver analysis system 610 determines the rate of occurrence of rapid acceleration events for all drivers in the peer driver group. For instance, this may be determined as a rate or an average number of rapid acceleration events per time period of driving. Alternatively, it may be determined as an absolute figure for a fixed time period, the number of rapid acceleration events per week. Driver analysis system 610 then determines the occurrence of rapid acceleration events for target driver in the same manner. The performance of target driver is compared to the average for the peer group. Target driver's performance may also be compared to other characteristics of the peer group including, but not limited to, minimum, maximum, best, and worst. Those skilled in the art will recognize there are many other operational and behavioral parameters which may be analyzed and many types of statistical analysis which may be performed on the data. The invention is not limited to the specific examples provided above.

Based on the results of the analysis, driver analysis system 610 generates driving report 650 which identifies the driving performance of the target driver and comparisons to the peer group. Driver analysis system 610 transfers driving report 650 to one or more entities 660 for viewing by sending it over network 680 or other means. Target driver and/or other entities 660 receive driving report 650 over network 680 through a target device and view the report on that device.

The target device may be paper, a personal computer, mobile phone, mobile internet terminal, or other type of electronic communication device. Driving report 650 may be transmitted in the form of mail, email, text message, or displayed on a web page. Driving report 650 may also be incorporated into a software document, such as a MS Word file, a PDF file, a Power Point file, or the like. In yet another example, the analysis may be provided in a video format and played-out to the user. An audio presentation of the analysis may also be possible, such as by way of a voicemail message, a phone recording, or the like.

Network 680 may include a wired or wireless network, such as satellite, cellular, Wi-Fi, internet, Bluetooth-type, near field communication-type, or any other type of network or communication schema. Entity(s) 660 may include a supervisor, driver, group, or other entities.

Figure 7:
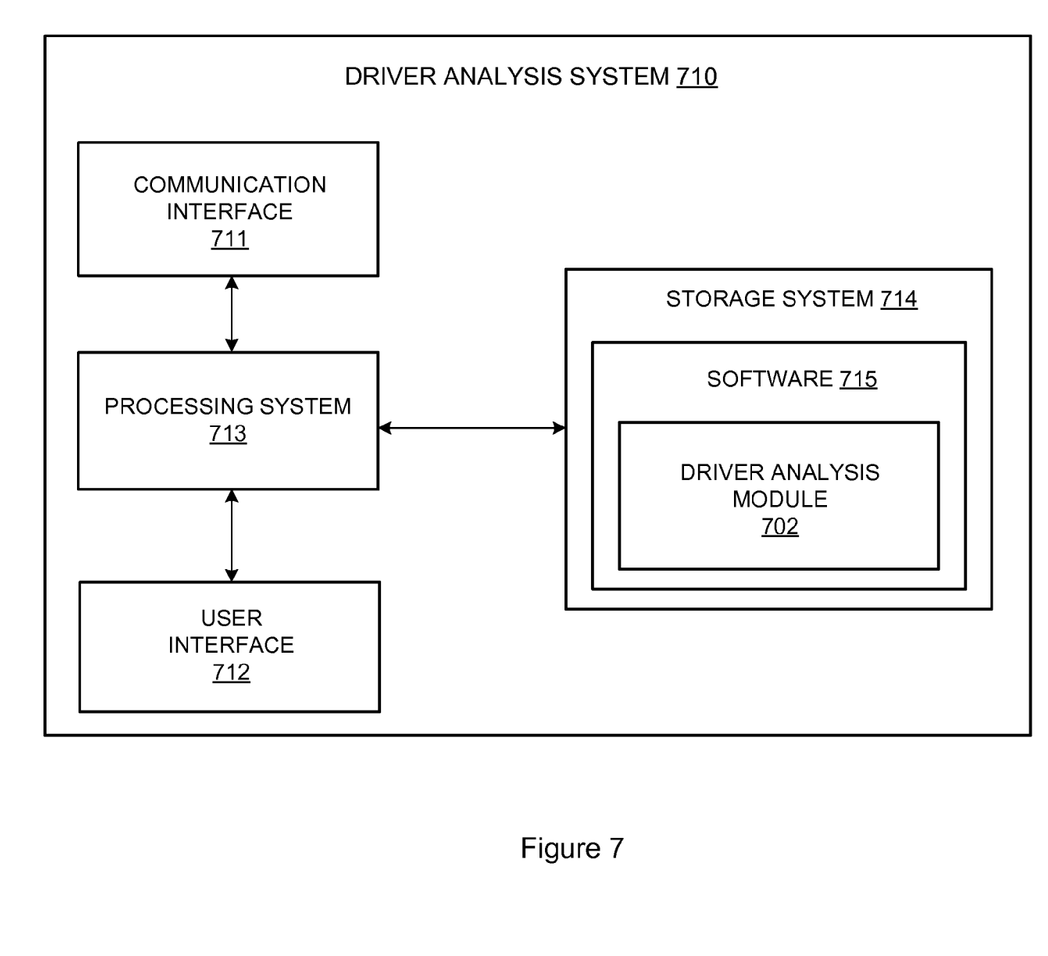
FIG. 7 illustrates a driving report system.

FIG. 7 illustrates driver analysis system 710 which is exemplary of the driver analysis systems in previous figures. Driver analysis system 710 is capable of receiving and processing vehicle performance data for a vehicle driven by a user, as well as other information from other database and sources. Driver analysis system 710 processes the performance data to generate an analysis of the driving behavior of the user. Driver analysis system 710 then provides a driving report one or more entities.

Driver analysis system 710 includes communication interface 711, user interface 712, processing system 713, storage system 714, and software 715. Software 715 includes driver analysis module 702. Processing system 713 is linked to communication interface 711 and 712. Software 715 is stored on storage system 714. In operation, processing system 713 executes software 715, including driver analysis module 702, to operate as described herein.

Communication interface 711 comprises a network card, network interface, port, or interface circuitry that allows storage system 714 to obtain vehicle performance data. Communication interface 711 may also include a memory device, software, processing circuitry, or some other communication device.

User interface 712 comprises components that interact with a user to receive user inputs and to present media and/or information. User interface 712 may include a speaker, microphone, buttons, lights, display screen, mouse, keyboard, or some other user input/output apparatus—including combinations thereof. User interface 712 may be omitted in some examples.

Processing system 713 may comprise a microprocessor and other circuitry that retrieves and executes software 715, including driver analysis module 702, from storage system 714. Storage system 714 comprises a disk drive, flash drive, data storage circuitry, or some other memory apparatus. Processing system 713 is typically mounted on a circuit board that may also contain storage system 714 and portions of communication interface 711 and user interface 712.

Software 715 comprises computer programs, firmware, or some other form of machine-readable processing instructions. Software 715 may include an operating system, utilities, drivers, network interfaces, applications, virtual machines, or some other type of software, such as driver analysis module 702. When executed by processing system 713, software 715 directs processing system 713 to operate as described herein.

In operation, driver analysis module 702, when executed by processing system 700, operates as follows. Driver analysis module 702 directs computer system 700 to obtain vehicle performance data for a vehicle driven by a user. For instance, via communication interface 711, computer system 700 may communicate with a system capable of providing driver, vehicle, and operational data. It should be understood that computer system 700 may communicate remotely or directly with such an interface.

In another example, communication interface 711 may merely gather positioning and time information from a positioning system on-board a vehicle. A vehicle may contain a GPS unit capable of determining the vehicle's location, and/or other information from a smartphone or other devices. This location information can be communicated to communication interface 711. Using the position and time information gathered by communication interface 711, processing system 713 is able to derive performance information related to the performance and operation of the vehicle.

It should be understood that the analysis may be provided directly to the user by way of user interface 712, such as by displaying the analysis on a display screen. However, it should also be understood that the analysis may be provided, by way of communication interface 711, to a user device capable of presenting the analysis to the user. Driver analysis system 710 may also be capable of indicating eye movement and/or eye movement index.

Figure 8:
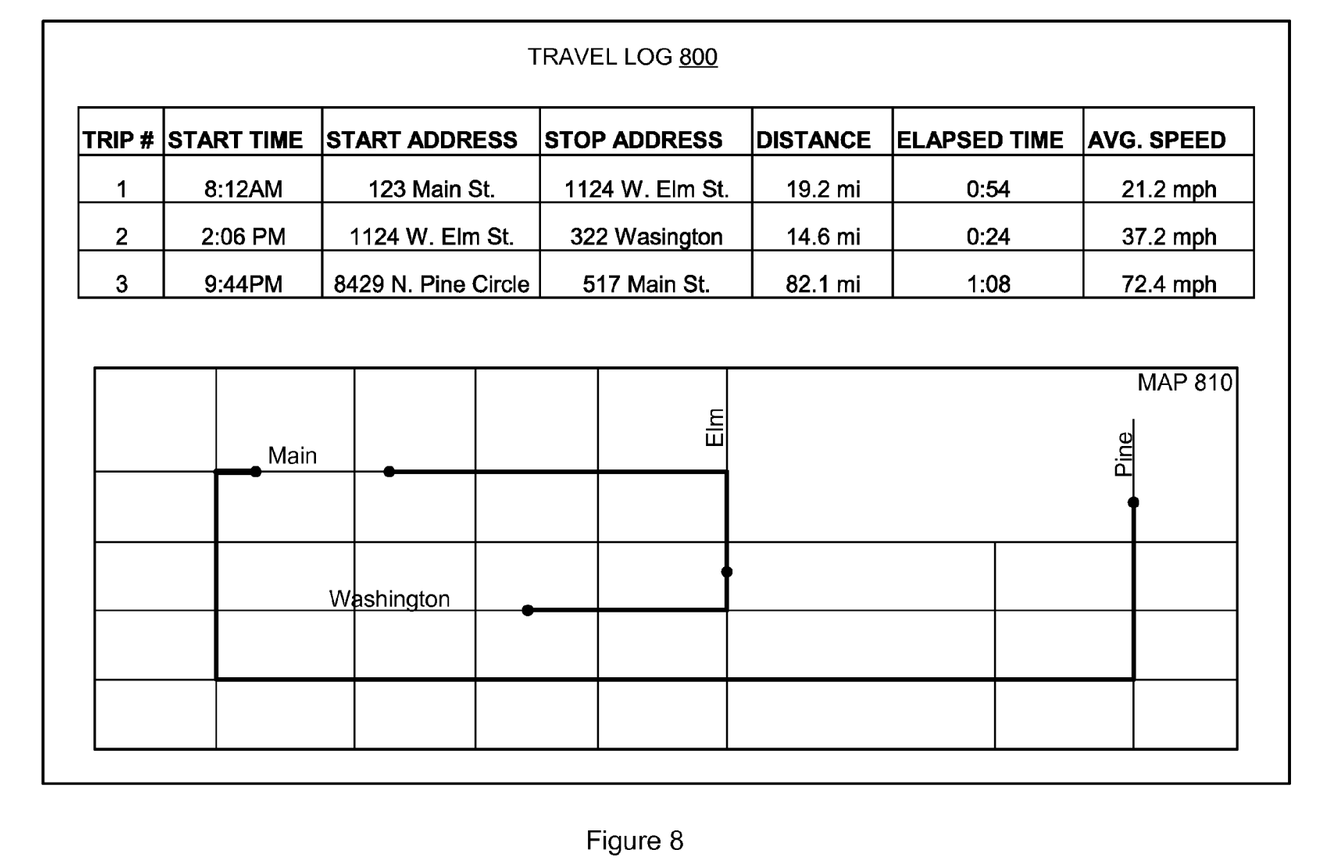
FIG. 8 illustrates the travel log portion of a driving report.

FIG. 8 illustrates travel log 800 which may be included in a driving report. Travel log 800 includes a detailed listing of trips made using the vehicle during the reporting period. The listing includes start time, start address, stop address, distance, elapsed time, and average speed for each trip. Other information describing the nature of each trip and the operational characteristics of the vehicle during that trip is also possible. Travel log 800 also includes map 810 which visually illustrates the route of each trip or trip segment on a map.

It should be understood that many advantages are provided by the systems and methods disclosed herein for analyzing driver performance and providing a presentation of the performance Driver behavior can be altered via a feedback loop that does not distract the driver. This may be referred to as delayed feedback. While some past systems record incident behavior—such as at the moment of a crash—the disclosed systems and methods analyze behavior so as to reduce the occurrence of such incidents in the future. It can be shown that driving habits and behavior directly correlate to and are predictive of risk of collision or crash. Other patterns of behavior relate to inefficient fuel consumption, route determination, and excessive emissions. Thus, the disclosed systems and methods can reduce the occurrence of accidents, improve environmental factors, and reduce costs.

After extensive study of a large volume of drivers and reported events of various types, it has been determined that many aspects of driver behavior exhibit a 'log-normal' distribution. A log-normal distribution is a probability distribution of a random variable whose logarithm is normally distributed. Strategies for comparing and ranking drivers must take this into account. Linear normalization, histograms, and bell curves will not reveal critical differences in driver performance Log-normal distribution may increase the driver's confidence in the system in that it will show most drivers as "above average." Since most drivers consider themselves above average, it will reinforce that belief, and the driver's confidence in the report and system.

A driver analysis module, such as module 702 described above, may produce a scorecard that may provide three different perspectives on the behavior of a specific driver:

- log normal ranking of each driver against a population of other drivers for a given time interval for each metric gathered by the vehicle monitoring system,
- a trend of the absolute number of events for each metric over an extended period of time,
- an overall numeric score which weights various log normal ranking of metrics In one embodiment, the formula used for calculating a Combined Weighted Score is as follows.

Combined Weighted Score [CWS] is a mathematical calculation for a specific individual over a specific period of time compared with a specific peer group know as a SCOPE.

Each measured attribute (Hard Brakes, Rapid Starts, Overspeed, etc.) has an individual score [IS] associated with it for a given period of time related to a specific SCOPE.

Each IS has a weighted value [ISW] as it relates to that specific SCOPE. Different SCOPES may have different ISW values.

This allows each and any SCOPE to have its own subset of the Individual Scores and associated weighting in determining the Combined Weighted Score calculations.

Definitions

CWS.Scope(i)—Combined Weighted Score for all Individual Scores (i.e. attributes) participating in the calculations in the Scope(i)

CWS.Scope(i).Min=60 (Minimum score possible)
CWS.Scope(i).Max=100 (Maximum score possible)
IS (i,j)—Individual Score (j) for the Attribute(j) in the Scope(i)
ISW(i,j)—Individual Score Weight(j) for the Attribute(j) in the Scope(i). Units of measure: %
For each and any Scope(i) the following is always true:
SUM (ISW(i,j))=100%, where: j=1, m(i) AND m (i) is number of the Individual Scores participating in the Scope(i)
Combined Weighted Score Calculation $$CWS.Scope(i)=CWS.Scope(i).Min+(CWS.Scope(i).Max-CWS.Scope(i).Min)*(ISW(i,1)*IS(i,1)+ISW(i,2)*IS(i,2)+\ldots+ISW(i,m(i))*IS(i,m(i)))=CWS.Scope(i).Min+(CWS.Scope(i).Max-CWS.Scope(i).Min)*SUM(ISW(i,j)*IS(i,j))$$

Where: j=[1, m(i)] AND m (i) is number of the Individual Scores participating in the Scope(i).
Implementation:
In create/edit scope UI, there is a table with 2 columns.
1st column: Name of the attribute available in the scope
2nd column: Individual Score Weight (ISW(i,j))
The SUM(ISW(i,j))=100% has to be enforced
Default behavior:
Hard Brakes=25%
Rapid Starts=25%
Speeding=25%
Night Driving=0%
Idling=25%
Average MPG=0%
Hard Driving=0%

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a driver analysis system, the method comprising:
    receiving vehicle operation data from one or more monitoring systems, corresponding to operation of one or more vehicles operated by one or more drivers by the driver analysis system;
    generating a driving report which identifies the driving performance of a target driver; and
    presenting the driving report for viewing by one or more entities,
    wherein the vehicle operation data comprises an indication of eye movement index of the target driver,
    wherein the performance of the target driver is compared to a best, worst, and average of other of the one or more other drivers.

2. The method of claim 1, wherein the eye movement index is based at least in part on one or more of characteristics of the target driver, information associated with the location, and information associated with eye movement of the target driver.

3. The method of claim 1, wherein the driver analysis system received data from other databases, and the driving report is based at least in part on the data form other databases.

4. The method of claim 1, wherein the vehicle operation data is received at a communication interface in the driver analysis system from the one or more monitoring systems located generally adjacent the one or more vehicles.

5. The method of claim 4, wherein the one or more monitoring systems comprise an imaging device capable of determining eye movement of the one or more drivers.

6. The method of claim 4, wherein the one or more monitoring systems comprises at least one of an accelerometer, GPS functionality, flash memory, a processor, a real-time operating system, satellite communication capabilities, cellular communication capabilities, near field communication, and Bluetooth-type communication capabilities.

7. The method of claim 1, wherein the one or more monitoring systems are powered from the OBD port of the vehicle, and at least a portion of the vehicle operation data is gathered from a source other than from the OBD port of the one or more vehicles.

8. The method of claim 1, wherein the driving report comprises a safety score generally representing a level of safety of the driving performance of the target driver.

9. A driver analysis system comprising:
a communication interface configured to receive vehicle operation data corresponding to operation of a one or more of vehicles operated by one or more drivers;
an imaging device configured to determine eye movement of the one or more drivers;
a processing system configured to process at least a portion of the vehicle operation data or the eye movement to determine driving performance of the one or more drivers, and generate a driving score which generally identifies the driving performance of the one or more drivers, wherein the processing system is further capable of presenting the driving performance for the one or more drivers, and wherein the performance of the target driver is compared to a best, worst, and average of other of the one or more other drivers.

10. The driver analysis system of claim 9, wherein the processing system is further configured to determine a eye movement index based at least in part on the determined eye movement of the one or more drivers.

11. The driver analysis system of claim 9, further comprising a plurality of monitoring systems located generally adjacent the plurality of vehicles wherein the communication interface is capable of receiving the vehicle operation data from the plurality of monitoring systems.

12. The driver analysis system of claim 11, wherein each of the plurality of monitoring systems is powered from an on board diagnostic port on each of the plurality of vehicles and gathers at least a portion of the vehicle operation data from a source other than the OBD port.

13. The driver analysis system of claim 12, wherein the source other than the OBD port comprises at least one of an accelerometer, GPS functionality, flash memory, a processor, a real-time operating system, satellite communication capabilities, cellular communication capabilities, near field communication capability, and Bluetooth-type communication capabilities.

14. A non-transitory computer readable medium having stored thereon program instructions executable by a computing device that, when executed by the computing device, direct the computing device to:
receive vehicle operation data corresponding to operation of one or more vehicles operated by one or more drivers;
generate a driving report which identifies the driving performance of a target driver; and
presenting the driving report for viewing by one or more entities, wherein the vehicle operation data comprises an indication of eye movement index of the one or more drivers, and wherein the performance of the target driver is compared to a best, worst, and average of other of the one or more other drivers.

15. The computer readable medium of claim 14, wherein the eye movement index is based at least in part on one or more of characteristics of the target driver, information associated with the location, and information associated with eye movement of the target driver.

16. The computer readable medium of claim 15, wherein the processor is further capable of receiving eye movement data from an imaging device associated with one or more of the one or more vehicles.

17. The computer readable medium of claim 14, wherein the vehicle operation data is received at a communication interface in the driver analysis system from one or more monitoring systems located generally adjacent the one or more vehicles.

18. The computer readable medium of claim 14, wherein each of the plurality of monitoring systems is powered from an on board diagnostic port on each of the plurality of vehicles and comprises at least one of an accelerometer, GPS functionality, flash memory, a processor, a real-time operating system, satellite communication capabilities, cellular communication capabilities, near field communication, and Bluetooth-type communication capabilities.

* * * * *